US012753878B2

(12) United States Patent
Lagadapati et al.

(10) Patent No.: US 12,753,878 B2
(45) Date of Patent: Oct. 6, 2026

(54) VEHICLE OIL COOLING CIRCUITS

(71) Applicant: Caterpillar Inc., Peoria, IL (US)

(72) Inventors: Maitreya V. Lagadapati, Joliet, IL (US); Edward William Mate, Manhattan, IL (US); Thomas K. Aldridge, Romaine (AU); William N. O'Neill, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 269 days.

(21) Appl. No.: 18/532,440

(22) Filed: Dec. 7, 2023

(65) Prior Publication Data

US 2025/0189075 A1 Jun. 12, 2025

(51) Int. Cl.
*F16N 39/02* (2006.01)

(52) U.S. Cl.
CPC .......... *F16N 39/02* (2013.01); *F16N 2200/10* (2013.01); *F16N 2270/70* (2013.01); *F16N 2280/02* (2013.01)

(58) Field of Classification Search
CPC ...... F16N 39/02; F16N 39/04; F16N 2200/10; F16N 2270/70; F16N 2280/02; F01P 2060/04; F01P 2025/08; B60K 11/02; F01M 5/005; F16D 65/78; F16H 57/04; F16H 57/0412; F16H 57/0413
See application file for complete search history.

(56) References Cited

U.S. PATENT DOCUMENTS 8,714,310 B2 5/2014 Bares et al.
8,739,932 B2 6/2014 Ramler
8,844,279 B2 9/2014 Nelson et al.
8,869,757 B2 * 10/2014 Kim .................... F02B 29/0443 123/41.31
9,597,951 B2 3/2017 Alm et al.
10,465,574 B2 11/2019 Kiyokami et al.
11,674,589 B2 6/2023 Sheidler et al.
2009/0050424 A1 * 2/2009 Bares ...................... F16D 65/78 165/41
2016/0037707 A1 * 2/2016 Bebernes ............. G05D 1/0212 180/6.48
2016/0178048 A1 * 6/2016 Lippert ............... F16H 57/0413 475/160
2017/0096115 A1 * 4/2017 Delp ....................... F16N 39/02
2017/0167595 A1 * 6/2017 Cole ................... F16H 57/0417
2017/0241324 A1 * 8/2017 Liu ........................... F01P 7/16
2019/0368624 A1 * 12/2019 Ensign ................ F16K 17/0486
2021/0023950 A1 1/2021 Clowes et al.
2021/0087956 A1 * 3/2021 Grosch .................. F01M 5/005
(Continued)

FOREIGN PATENT DOCUMENTS

CN 101804782 A * 8/2010
CN 202140377 2/2012
(Continued)

*Primary Examiner* — John Olszewski
*Assistant Examiner* — Matthew D Lee

(57) ABSTRACT

A cooling system can include a hydraulic oil tank. The cooling system can further include a return valve connected to the hydraulic oil tank to supply flow to a cooling circuit. The cooling circuit can include a hydraulic oil cooling (HOC) element and an axle oil cooling (AOC) element connected in series. The cooling system can include a flow control device to route oil away from the HOC and toward the AOC based on an oil condition or a system condition.

22 Claims, 5 Drawing Sheets

(56) References Cited

U.S. PATENT DOCUMENTS

| | | | | |
|---|---|---|---|---|
| 2022/0305923 | A1* | 9/2022 | Hagen | B60L 53/122 |
| 2023/0278475 | A1* | 9/2023 | Steffens | B60K 37/20<br>180/334 |

FOREIGN PATENT DOCUMENTS

| | | | | | |
|---|---|---|---|---|---|
| CN | 112377544 | A | * | 2/2021 | F16D 65/853 |
| CN | 214466002 | U | * | 10/2021 | |
| DE | 10301448 | | | 7/2004 | |
| JP | 2014020431 | A | * | 2/2014 | F15B 11/08 |

* cited by examiner

VEHICLE OIL COOLING CIRCUITS

TECHNICAL FIELD

This disclosure relates generally to machine cooling in electric machines. More particularly, the disclosure relates to oil circuits for cooling components including axles of electric machines.

BACKGROUND

Battery electric machines (BEM) are a type of electric machine that rely solely on electric power stored in a battery module to propel and operate the machine. Diesel electric machines (DEM) include a diesel engine and electrical systems such as generators. Power from the engine is converted to electricity by the electrical systems, which then powers an electric motor. Both BEMs and DEMs use hydraulic oil circuits to cool and lubricate some components such as brake and axle components. A dedicated hydraulic oil cooling pump provides oil under pressure to machine components. This pump can be inefficient and produce an excessive heat load particularly during brake charge events.

U.S. Pat. No. 8,739,932 describes a hydraulic filtering, cooling and lubrication system for use with a vehicle including an engine, a pump coupled to the engine and a plurality of axles. The system includes a separate manifold for each axle of the vehicle and/or each pair of wet disc brakes.

SUMMARY

This disclosure describes a cooling system. The cooling system can include a hydraulic tank. A return valve connected to the hydraulic oil tank can supply flow to a cooling circuit. The cooling circuit can include a hydraulic oil cooling (HOC) element and an axle oil cooling (AOC) element connected in series. A flow control device can route oil away from the HOC and toward the AOC based on an oil condition or a system condition.

Further described is a method for providing system cooling in a vehicle. The method can include connecting a hydraulic oil cooling (HOC) element and an axle oil cooling (AOC) element in series. The method can include providing a return valve to route oil from a hydraulic oil tank to a cooling circuit. The method can include providing a flow control device to route oil away from the HOC and toward the AOC based on an oil condition or a system condition.

Further described is a work machine including a plurality of axles. The work machine can further include a hydraulic oil tank communicatively coupled to the plurality of axles through a return valve to provide oil to a cooling circuit. The cooling circuit can include a hydraulic oil cooling (HOC) element and an axle oil cooling (AOC) element connected in series. The work machine can also include a flow control device configured to route oil away from the HOC and toward the AOC based on an oil condition or a system condition. Other systems, methods, and apparatuses are described.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
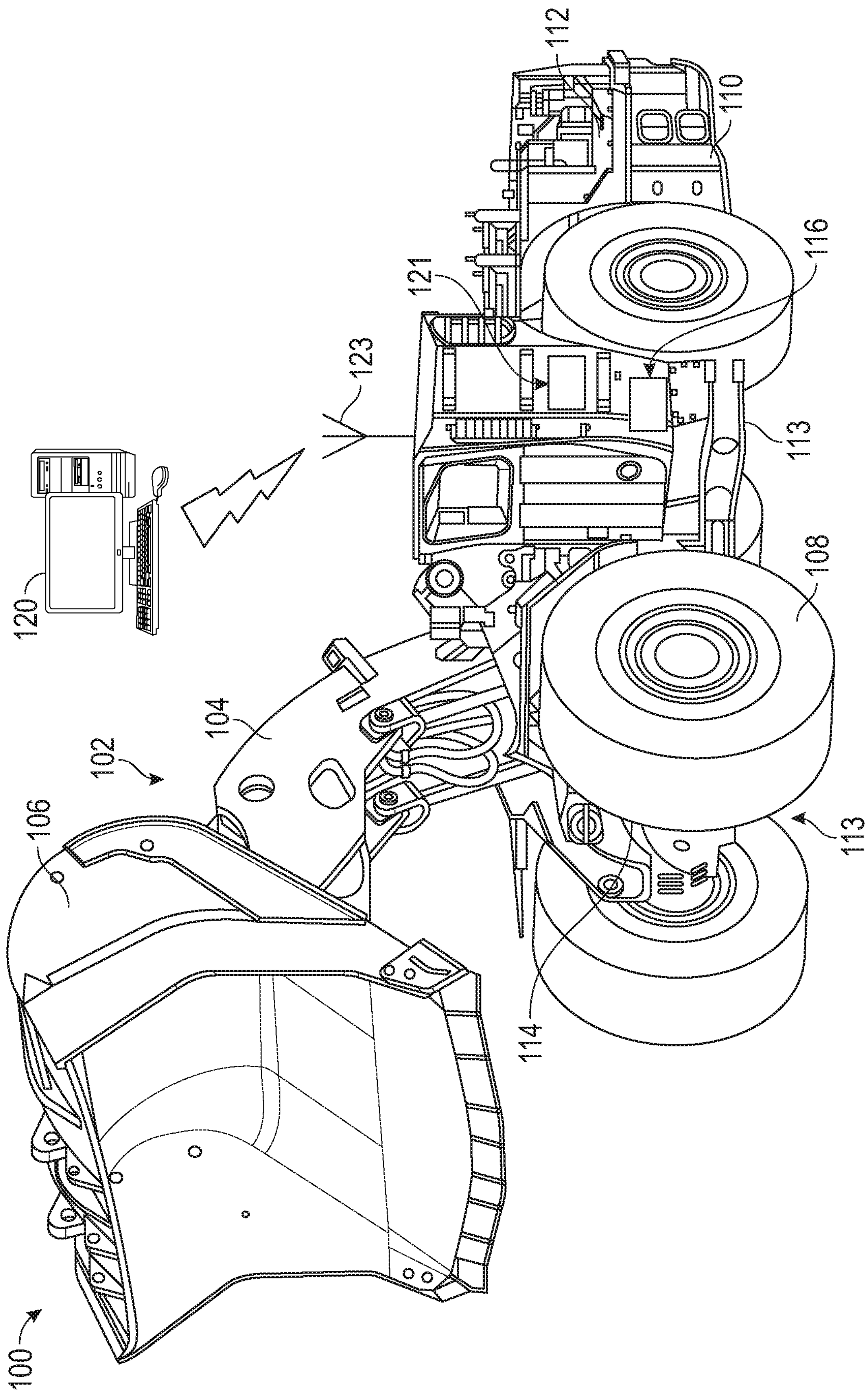
FIG. 1 is a perspective view of an example of a work machine that can implement various techniques of this disclosure.

FIG. 1 is a perspective view of a work machine 100. As shown, the work machine 100 may be an underground loader used in mining operations and may include an implement 102 in the form of lift arms 104 and a tilting bucket 106. That is, the lift arms 104 may be arranged and configured to lift the tilting bucket 106 and the tilting bucket 106 may be arranged and configured on the lift arms 104 to tilt relative to the lift arms 104. The implement system may be moveable using a hydraulic system. The work machine may include a plurality of ground supporting traction elements 108 (e.g., wheels, tracks, skid feet, etc.) for translating the work machine relative to a supporting surface. The traction elements 108 may be coupled to a frame 110 of the work machine 100 with a suspension system. The work machine 100 may include an engine or motor 112 to generate power and to drive the traction system 108, the hydraulic system, and other onboard equipment or systems. Axles 113 can rotate the wheels or other traction elements 108.

The work machine 100 can be a battery electric machine (BEM) or diesel electric machine (DEM). BEMs are a type of electric machine use electric power stored in a battery 116 (showing an example placement if the work machine 100 were a BEM) to propel and operate the machine. DEMs include a diesel engine and electrical systems such as generators. Power from the engine is converted to electricity by the electrical systems, which then powers an electric motor.

In FIG. 1, the lift arms 104 are shown in a raised position and revealing a lift arm hydraulic system 114 including a pair of hydraulic cylinders for raising and lowering the lift arms 104. The lift arm hydraulic system 114 is one component of a hydraulic system of the work machine 100. For example, both BEMs and DEMs use hydraulic oil circuits to cool and lubricate some components such as brake and axle 113 components. A dedicated hydraulic oil cooling pump could provide oil under pressure to machine components. However, this pump can be inefficient and produce an excessive heat load particularly during brake charge events as the brake charge circuit provides oil flow to axles, etc.

Systems, methods, and apparatuses according to example embodiments address these concerns by eliminated the dedicated hydraulic oil cooling pump. Instead, for DEMs, a radiator fan return and steering system return supply hydraulic oil flow to a combined hydraulic oil cooling (HOC) and axle oil cooling (AOC) system. When the work machine 100 is a BEM, then an implement system return and steering system return are provided to supply flow to the combined HOC/AOC system. Further, in cases of cold ambient temperatures, the flow bypasses the HOC to provide heat to the AOC.

Figure 2:
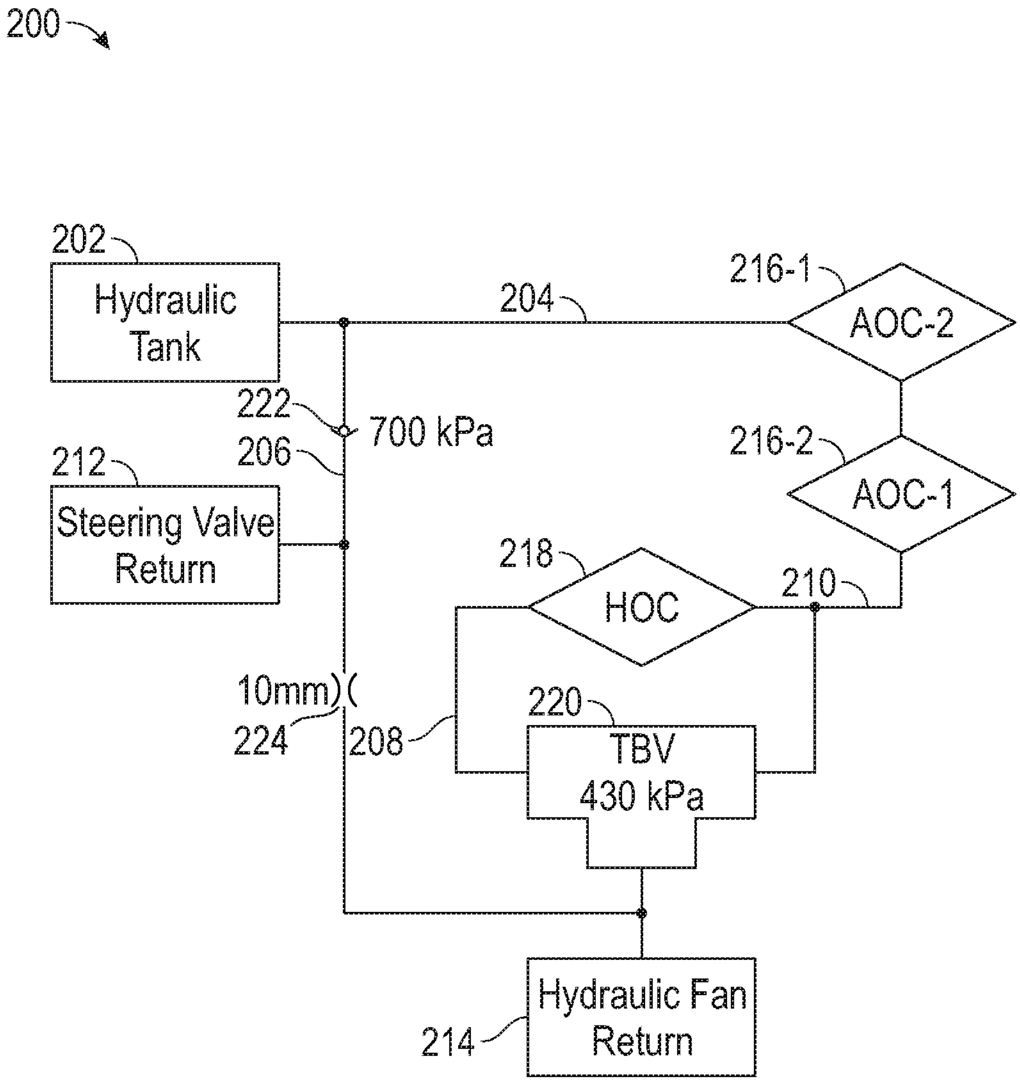
FIG. 2 is a schematic diagram of a hydraulic oil cooling and axle oil cooling circuit for use on a diesel electric machine according to some embodiments.

FIG. 2 is a schematic diagram of a hydraulic oil cooling and axle oil cooling circuit 200 for use on a diesel electric machine according to some embodiments. As shown, the hydraulic system 200 may include a hydraulic tank 202 and hydraulic lines 204, 206, 208, 210. A steering valve return 212 and a hydraulic fan return 214 can supply flow to the circuit 200.

The hydraulic tank 202 may be configured for holding a supply of hydraulic fluid for use by the circuit 200. The hydraulic tank 202 may include a holding tank, for example. The tank may be generally closed to prevent intrusion of contaminants but may include valves or other ports allowing the tank to be maintained at or near atmospheric pressure or another baseline pressure. A steering valve return 212 and a hydraulic fan return 214 can be coupled to supply oil flow to the circuit 200. The hydraulic tank 202 can receive oil flow and make the oil available to circuit 202.

Hydraulic lines 204, 206, 208, 210 may extend from the hydraulic tank to AOC 216-1, AOC 216-2 and HOC 218. The hydraulic lines 204, 206, 208, 210 may include resistance devices capable of maintaining the hydraulic fluid at a preferred pressure (e.g., about 700 kPa for DEMs) to divert the return flow going from hydraulic tank 202 to thermal bypass valve 220. For example, as illustrated in FIG. 2, axle oil cooling circuit includes a pressure relief valve (PRV) 222 and a metering orifice 224. The PRV 222 is arranged between the hydraulic tank 202 and the steering valve return 212 and the orifice 224 is arranged between the steering valve return 212 and the hydraulic fan return 214. The PRV 222 can be configured/set to a relief threshold pressure, e.g. 700 kPa such that any pressure of flow above the threshold will open the PRV and oil will flow to the hydraulic tank bypassing the cooling system including the HOC 218 and the AOC 216-1 and AOC 216-2. The orifice 224 can be sized to manage flow contribution between the steering valve return 212 and the hydraulic fan return 214 such that, e.g. should the flow required by the cooling system (via a thermal bypass valve 220) be greater than available from the hydraulic fan return 214, flow will automatically be supplied through orifice from the steering valve return 212.

The HOC 218 and the AOC 216-1 and AOC 216-2 can be fluidly connected through the hydraulic fluid/oil and therefore become thermally connected by heat transfer to or from the hydraulic fluid/oil. The AOC 216-1 and AOC 216-2 are within an axle oil circulating loop wherein the axle oil does not mix with the hydraulic oil. Similarly, the HOC 218 can transfer heat from the hydraulic oil to another fluid that does not mix with the hydraulic oil. The other fluid can comprise ambient air or a liquid such as water/coolant, etc.

The circuit 200 can include a flow control device (e.g., thermal bypass valve (TBV)) 220. During cold temperatures (e.g., when ambient air temperature is below a threshold such as below freezing, etc.) the TBV 220 can cause steering valve return 212 to bypass the HOC 218 to provide heated (warm but not hot) hydraulic oil to AOC 216-1 and AOC 216-2. This can improve operation of axles by allowing warming of the axles during cold weather operation. The TBV 220 also prevents unwanted cooling of oil during cold weather situations. For example, when the oil is relatively cold (<110° F., 43° C.), the TBV 220 is open directing flow around the HOC 218 with minimum pressure loss and enabling the oil temperature to increase to operating temperature. Further cooling is therefore not undertaken and the oil is provided uncooled to the AOC 216-1 and AOC 216-2. Once a desired temperature is reached (e.g., >110° F., 43° C.), the TBV 220 can close, and full flow is directed through the HOC 218.

Figure 3:
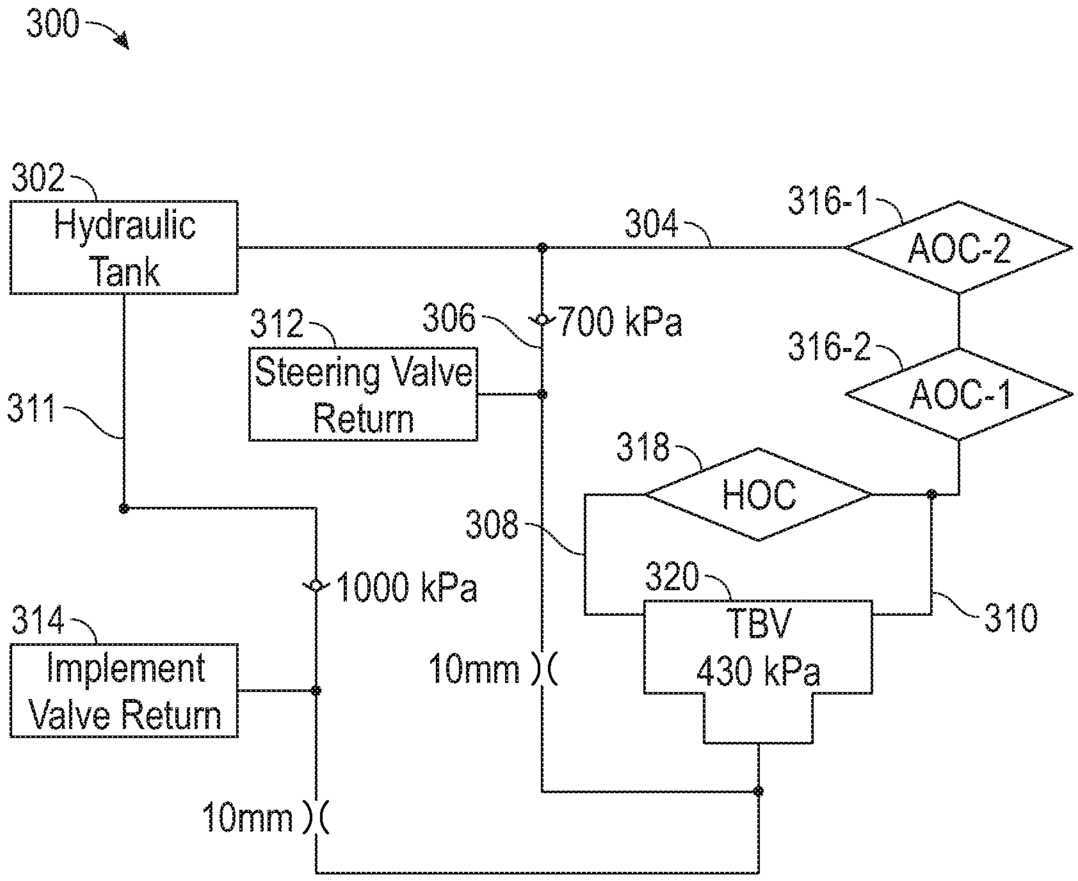
FIG. 3 is a schematic diagram of a hydraulic oil cooling and axle oil cooling circuit for use on a battery electric machine according to some embodiments.

FIG. 3 is a schematic diagram of a hydraulic oil cooling and axle oil cooling circuit 300 for use on a battery electric machine (BEM) according to some embodiments. As shown, the circuit 300 may include a hydraulic tank 302 and hydraulic lines 304, 306, 308, 310, 311 similar to the circuit 200 (FIG. 2). As in circuit 200, the circuit 300 can include a steering valve return 312. However in some embodiments an implement valve return 314 as shown is provided more efficiently instead of the hydraulic fan return 214 (FIG. 2). In some other example embodiments, a hydraulic fan return can be provided in the circuit 300, in which embodiments the oil flow from the hydraulic fan return can be provided instead of oil from the implement valve return 314. The steering valve return 312 and implement valve return 314 can supply flow to the circuit 300.

Hydraulic lines 304, 306, 308, 310, 311 may extend from the hydraulic tank to AOC 316-1, AOC 316-2 and HOC 318 and additionally to the implement valve return 314. The hydraulic lines 304, 306, 308, 310, 311 may include resistance devices-capable of maintaining the hydraulic fluid at a preferred pressure (e.g., about 700 kPa for BEMs or 1000 kPa for lines to the implement valve return 314) to divert the return flow going from hydraulic tank 302 to thermal bypass valve 320. As described above, the HOC 318 and the AOC 316-1 and AOC 316-2 can be fluidly connected through the hydraulic fluid/oil and therefore become thermally connected by heat transfer to or from the hydraulic fluid/oil. The AOC 316-1 and AOC 316-2 are within an axle oil circulating loop wherein the axle oil does not mix with the hydraulic oil. Similarly, the HOC 318 can transfer heat from the hydraulic oil to another fluid that does not mix with the hydraulic oil. The other fluid can comprise ambient air or a liquid such as water/coolant, etc.

As with circuit 200 (FIG. 2), the circuit 300 can include a flow control device (e.g., TBV) 320. During cold temperatures (e.g., when ambient air temperature is below a threshold such as below freezing, etc.) the TBV 320 can cause steering valve return 312 and implement valve return 314 to bypass the HOC 318 to provide heated (warm although not hot) hydraulic oil to AOC 316-1 and AOC 316-2. This can improve operation of axles by allowing warming of the axles during cold weather operation as described above with respect to FIG. 2.

Figure 4:
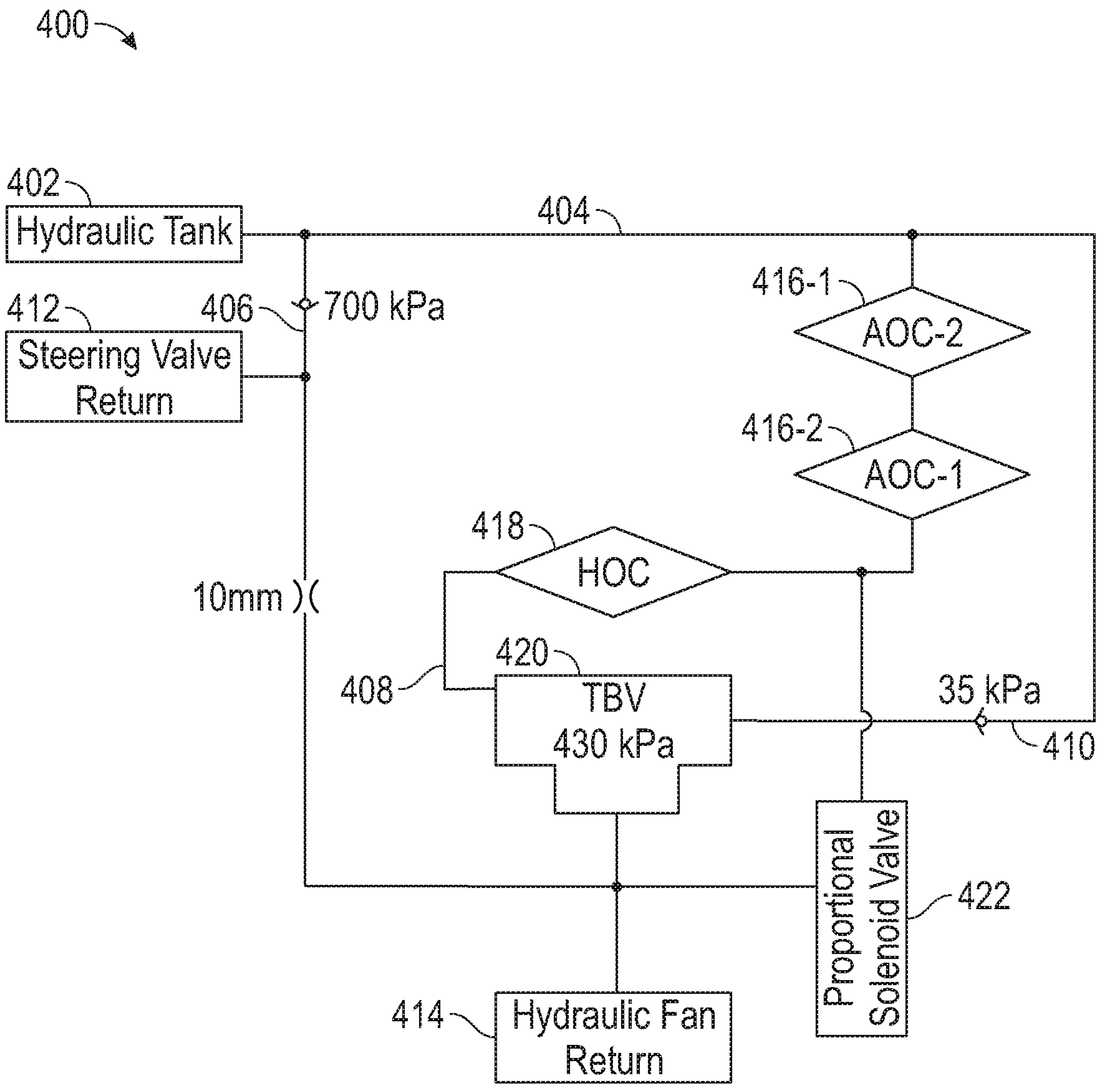
FIG. 4 is a schematic diagram of an alternative hydraulic oil cooling and axle oil cooling circuit according to some embodiments.

FIG. 4 is a schematic diagram of an alternative hydraulic oil cooling and axle oil cooling circuit 400 according to some embodiments. Similar to the circuit 200 (FIG. 2), the circuit 400 may include a hydraulic tank 402 and hydraulic lines 404, 406, 408, 410. A steering valve return 412 and a hydraulic fan return 414 can return supply flow to the circuit 400.

As described above with reference to FIG. 2-3, the hydraulic tank 402 may be configured for holding a supply of hydraulic fluid for use by the circuit 400. A steering valve return 412 and a hydraulic fan return 414 can be coupled to supply oil flow to the circuit 200. The hydraulic tank 402 can receive oil flow and make the oil available to circuit 400.

Hydraulic lines 404, 406, 408, 410 may extend from the hydraulic tank to AOC 416-1, AOC 416-2 and HOC 418. The hydraulic lines 404, 406, 408, 410 may include resistance devices capable of maintaining the hydraulic fluid at a preferred pressure (e.g., about 700 kPa) to divert the return flow going from hydraulic tank 402 to thermal bypass valve 420. As described above, the HOC 418 and the AOC 416-1 and AOC 416-2 can be fluidly connected through the hydraulic fluid/oil and therefore become thermally connected by heat transfer to or from the hydraulic fluid/oil. The AOC 416-1 and AOC 416-2 are within an axle oil circulating loop wherein the axle oil does not mix with the hydraulic oil. Similarly, the HOC 418 can transfer heat from the hydraulic oil to another fluid that does not mix with the hydraulic oil. The other fluid can comprise ambient air or a liquid such as water/coolant, etc.

The circuit 400 can include a solenoid valve 422. The solenoid valve 422 can be a proportional solenoid valve although embodiments are not limited thereto. Command logic for the solenoid valve 422 can be based on variable conditions of temperature, steering flow, and fan motor flow. The solenoid valve 422 can represent a flow resistance between an inlet to thermal bypass valve 420 and an inlet to the AOC 416-1 and AOC 416-2. The solenoid valve 422 may be an electrically actuated solenoid valve that is open in a non-energized condition and is closed in an energized condition. When the solenoid valve 422 is closed, oil flow through HOC 418 is controlled by the TBV 420 via the oil temperature. When the solenoid valve 422 is opened, decreased resistance allows varying amounts of oil (varying depending on the degree to which the valve 422 is opened) to bypass the TBV 420 and the HOC 418, allowing a more controllable electrically-based option than mechanical-based options described with respect to FIG. 2 and FIG. 3.

Referring again to FIG. 1, a controller 121 can be provided for electrically controlling various aspects of the work machine 100 including controlling solenoids (e.g., solenoid 422 (FIG. 4) or other components of hydraulic cooling systems described earlier herein. The controller 121 can control any of the valves, implements, and lift cylinders described herein. Still further, based on one more factors, the controller 121 may be configured to operate the solenoid 422 to adjust the oil flow through the HOC.

The controller 121 may be a standalone control system for the hydraulic system or the controller 121 may control other aspects of the work machine 100. In either case, the controller 121 may include a computing device having a processor and a computer readable storage medium. The computer readable storage medium may include computer implemented instructions stored thereon including method steps for controlling the equipment based on user input. That is, the work machine 100 may include one or more interfaces for controlling the equipment including, for example, joysticks, touch screens, levers, buttons, switches, throttles, etc. The controller 121 may be in electrical communication with the mentioned interfaces and may also be in electrical communication and/or signal communication with one or more aspects of the circuits 200, 300, 400 described above with reference to FIG. 2-4.

The controller 121 can receive signals using communication circuitry 123 or communication circuitry connected and the controller 121 can send and receive signals from various components of the work machine 100 during the operation of the work machine 100. The controller 121 can include onboard memory or memory in a remote location can be accessed. For example, the work machine 100 and controller 121 thereof can be wirelessly communicatively connected using communication circuitry 123 to remote system 120, wherein the remote system 120 can be used to monitor other machines of a fleet of work machines, or for remote processing.

Figure 5:
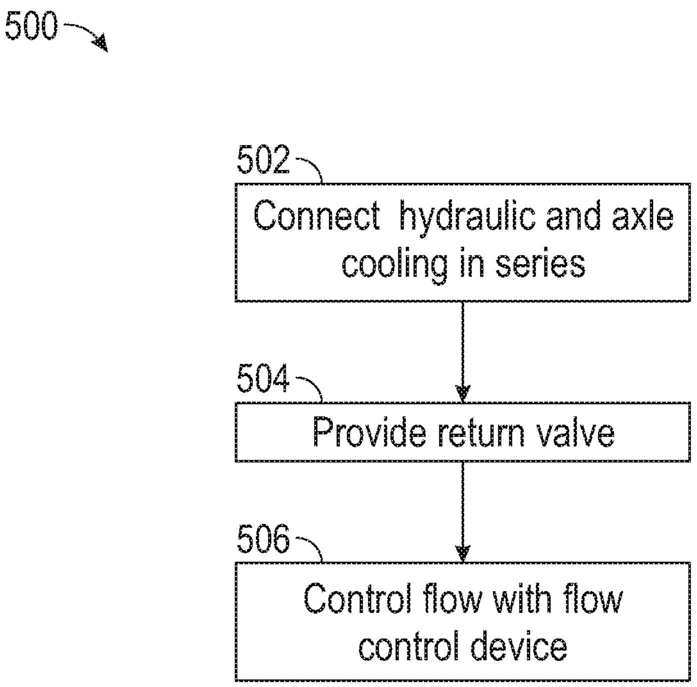
FIG. 5 is a flow diagram of a method for controlling braking productivity according to some embodiments.

FIG. 5 is a flow diagram of a method 500 for providing system cooling in a vehicle (e.g., work machine 100). Some operations of method 500 can be performed by any of the systems described above with respect to FIG. 1-4.

Method 500 can begin with operation 502 with connecting a HOC element (e.g., element 218 (FIG. 2) element 318 (FIG. 3) or element 418 (FIG. 4)) and an AOC element (e.g., element 216-1, 216-2 (FIG. 2) element 316-1, 316-2 (FIG. 3) or element 416-1, 416-2 (FIG. 4)) such that the HOC and respective AOC/s are thermally coupled to share heat between a hydraulic subsystem and an axle subsystem.

Method 500 can continue with operation 504 with providing a return valve to return flow supply oil to a cooling circuit. As described above with reference to FIG. 2-4, the return valve/s can include steering valve return, hydraulic fan return (e.g., radiator fan return) implement valve return/s, etc.

Method 500 can continue with operation 506 with providing a flow control device to route oil away from the HOC and toward the AOC based on an oil condition or a system condition. In examples, the flow control device can include a TBV (e.g., TBV 220 (FIG. 2), TBV 320 (FIG. 3) or TBV 420 (FIG. 4)). Instead or in addition, a solenoid (e.g., solenoid 422) can be provided. The solenoid 422 can comprise a proportional solenoid valve although embodiments are not limited thereto. By implementing methods similar to method 500, heat load can be substantially reduced in BEM and DEM systems. Cold temperature performance can be improved by strategic routing of warm hydraulic fluid away from HOC/s and toward AOC/s as described above.

INDUSTRIAL APPLICABILITY

The present invention relates to techniques for reducing heat load in diesel electric machines and battery electric machines. In example systems, rather than using a hydraulic pump, various return valves are applied, depending on the type of work machine, to provide oil cooling to axle systems. During cold ambient temperatures, a thermal bypass valve can be provided to route heated hydraulic oil to axle systems for further enhancements to machine performance.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A cooling system comprising:

a hydraulic oil tank;

a first return valve fluidically connected to the hydraulic oil tank and a cooling circuit and through which a first source of oil flows, the cooling circuit including a hydraulic oil cooling (HOC) element and an axle oil cooling (AOC) element connected in series;

a second return valve fluidically connected to the hydraulic oil tank and the cooling circuit and through which a second source of oil flows, the second return valve arranged in parallel with the first return valve such that the first source of oil and the second source of oil are configured to flow to the cooling circuit; and a flow control device configured to route oil away from the HOC element and toward the AOC element based on an oil condition or a system condition.

2. The cooling system of claim 1, wherein the HOC element and the AOC element are thermally connected to share heat between a hydraulic subsystem and an axle subsystem.

3. The cooling system of claim 1, wherein the flow control device is configured to route oil away from the HOC element and toward the AOC element if hydraulic oil temperature is below a threshold.

4. The cooling system of claim 3, wherein the flow control device includes a thermal bypass valve.

5. The cooling system of claim 1, wherein the flow control device includes a solenoid.

6. The cooling system of claim 1, wherein the first return valve comprises a steering valve return.

7. The cooling system of claim 6, wherein the cooling system is included in a diesel electric system and wherein the second return valve is a hydraulic fan return coupled to the flow control device.

8. The cooling system of claim 6, wherein the cooling system is included in a battery electric system and wherein the second return valve is an implement valve return coupled to the flow control device.

9. The cooling system of claim 1, further comprising a metering orifice arranged between first return valve and the second return valve.

10. The cooling system of claim 1, further comprising a pressure relief valve arranged between the hydraulic oil tank and the first return valve.

11. A method for providing system cooling in a vehicle, the method comprising:

connecting a hydraulic oil cooling (HOC) element and an axle oil cooling (AOC) element in series to form a portion of a cooling circuit;

routing a first source of oil through a first return valve and a flow control device to the cooling circuit;

routing a second source of oil through a second return valve and the flow control device to the cooling circuit; and controlling the flow control device to route oil around the HOC element to the AOC element based on an oil condition or a system condition.

12. The method of claim 11, further comprising connecting the HOC element and the AOC element thermally to share heat between a hydraulic subsystem and an axle subsystem.

13. The method of claim 11, wherein controlling the flow control device comprises controlling the flow control device to route oil around the HOC element to the AOC element if hydraulic oil temperature is below a threshold.

14. The method of claim 13, wherein the flow control device includes a solenoid and controlling comprises providing an electrical signal to the solenoid.

15. A work machine comprising:

a plurality of axles;

a hydraulic oil tank communicatively coupled to a cooling circuit for the plurality of axles;

a first return valve connected to the hydraulic oil tank and the cooling circuit, a first source of oil flowing through the first return valve;

a second return valve connected to the hydraulic oil tank and the cooling circuit, a second source of oil flowing through the second return valve; and a flow control device, the cooling circuit including a hydraulic oil cooling (HOC) element and an axle oil cooling (AOC) element connected in series, the second return valve arranged in parallel with the first return valve such that the first source of oil and the second source of oil are configured to flow to the cooling circuit, and the flow control device configured to route oil around the HOC element to the AOC element based on an oil condition or a system condition.

16. The work machine of claim 15, wherein the HOC element and the AOC element are thermally connected to share heat between a hydraulic subsystem and an axle subsystem.

17. The work machine of claim 15, wherein the flow control device is configured to route oil around the HOC element to the AOC element if hydraulic oil temperature is below a threshold.

18. The work machine of claim 15, further comprising a diesel engine, and wherein the second return valve is a hydraulic fan return coupled to the flow control device.

19. The work machine of claim 18, wherein the first return valve comprises a steering valve return.

20. The work machine of claim 15, wherein the work machine includes a battery electric system and wherein the second return valve is an implement valve return coupled to the flow control device.

21. The work machine of claim 15, wherein the flow control device includes a thermal bypass valve.

22. The work machine of claim 15, wherein the flow control device includes a solenoid.

* * * * *